(No Model.)
S. W. KIMBLE.
TROLLEY WHEEL FOR ELECTRIC RAILWAYS.
No. 464,370.  Patented Dec. 1, 1891.
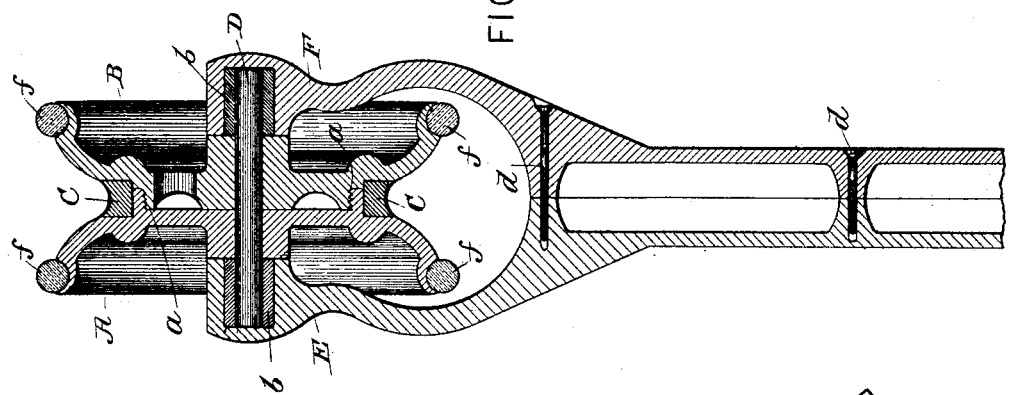
FIG. I.
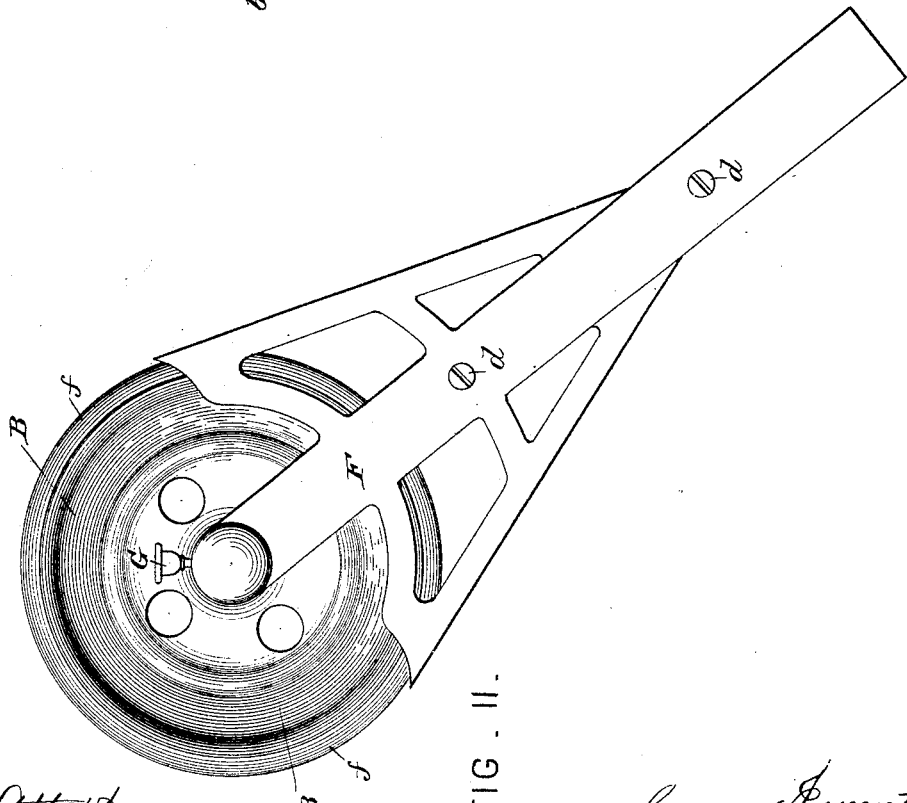
FIG. II.
Attest:
Geo. T. Smallwood
Inventor
Smith W. Kimble
by Pollok & Mauro
his attys

United States Patent Office.

SMITH W. KIMBLE, OF DENVER, COLORADO, ASSIGNOR TO THE MICA ASBETITE INSULATING COMPANY, OF SAME PLACE.

TROLLEY-WHEEL FOR ELECTRIC RAILWAYS.

SPECIFICATION forming part of Letters Patent No. 464,370, dated December 1, 1891.

Application filed May 29, 1891. Serial No. 394,566. (No model.)

*To all whom it may concern:*

Be it known that I, SMITH W. KIMBLE, a resident of Denver, county of Arapahoe, and State of Colorado, have invented a new and useful Improvement in Trolley-Wheels for Electric Railways, which improvement is fully set forth in the following specification.

The present invention relates to the construction of trolley-wheels for electrically-propelled vehicles, and its general objects are to attain simplicity in construction and efficiency in use.

Heretofore a trolley-wheel has been made by forming the hub in two parts, to which the flanges are attached by rivets, screwing one part of the hub upon another and securing between them an annular contact piece or ring, the two side flanges being further fastened together by bolts. The wheel was mounted to revolve loosely upon a pin or axle, like a loose pulley, necessitating a special construction of the chamber or bearing in the hub. According to the present invention the two sides of the wheel are cast or otherwise formed each of a single piece. They are adapted to be screwed together, not at the hub, but at the rim or base of the groove in which the trolley-wire is to run. A removable bearing-ring is let into the rim directly between the two side pieces. The wheel is mounted solidly on its shaft, which has bearings in removable bushings in the holder, thus avoiding the inconvenience of a loose mounting for the wheel.

As now constructed trolley-wheels frequently strike one of the insulating bells or hangers while the car is in motion. I propose to avoid this objection and the attendant damage by providing each of the flanges with rubber tires.

The advantages of the invention, as well as the manner of applying the same in practice, will be more fully understood by reference to the accompanying drawings, in which—

Figure I is a longitudinal section of the wheel and holder, and Fig. II is a side elevation thereof.

The frame of the wheel is made in two parts A B, which are screwed together at $a$. The contact-ring C is let in a groove formed partly in each piece and is secured directly between them. No rivets or other fastening devices are employed, or are necessary to hold the two side pieces together and keep the ring firmly in place. Consequently it involves little trouble and delay to take the wheel apart and move the contact-ring. The wheel is secured as by a key or feather to its shaft D and the latter is journaled at its ends in the removable bushings $b$, which are placed in chambers formed in the two parts E F of the holder or support. The latter are fastened together by two screws $d\ d$, so that the whole device can be taken to pieces in a few minutes. The bearings are lubricated by the oil-cups G, Fig. II, which are attached to the holder. The edges of the flanges are protected by rubber tires $f$, which are sprung into place and may be securely fastened to the wheel by any of the ordinary methods of attaching rubber tires.

Having now fully described my said invention, what I claim, and desire to secure by Letters Patent, is—

1. A trolley-wheel comprising in combination two side pieces, each constituting a hub and flange in one piece, said pieces being screwed together, and a contact-ring let into a groove formed in and between the two side pieces, substantially as described.

2. A trolley-wheel comprising in combination two side pieces forming between them the groove in which the trolley-wire runs and screwed together near the rim, and a metal contact-ring let into and held between the two side pieces, substantially as described.

3. A trolley-wheel provided with rubber tires on the flanges, between which the trolley-wire groove is formed, substantially as described.

In testimony whereof I have signed this specification in the presence of two subscribing witnesses.

SMITH W. KIMBLE.

Witnesses:
F. S. WATKINS,
JAMES RICE.